United States Patent
Gorrell et al.

(10) Patent No.: US 12,263,430 B2
(45) Date of Patent: Apr. 1, 2025

(54) FILTER SECUREMENT ASSEMBLY

(71) Applicant: 3M INNOVATIVE PROPERTIES COMPANY, St. Paul, MN (US)

(72) Inventors: Matthew W. Gorrell, South St. Paul, MN (US); John B. Stender, Duluth, MN (US); Tommie W. Kelley, Shoreview, MN (US); Andrew C. Smith, Cottage Grove, MN (US); Windy A. Santa Cruz, Minneapolis, MN (US); John F. Reed, North Oaks, MN (US); Jacob D. Carlson, Stacy, MN (US); Marcus W. Rein, St. Paul, MN (US); Jessalyn A. Cox, Rochester, MN (US); Zachary W. Boughton, Saint Paul, MN (US); Michael J. Stern, St. Louis Park, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 438 days.

(21) Appl. No.: 17/764,627

(22) PCT Filed: Oct. 21, 2020

(86) PCT No.: PCT/IB2020/059901
§ 371 (c)(1),
(2) Date: Mar. 29, 2022

(87) PCT Pub. No.: WO2021/079289
PCT Pub. Date: Apr. 29, 2021

(65) Prior Publication Data
US 2022/0339571 A1 Oct. 27, 2022

Related U.S. Application Data

(60) Provisional application No. 62/925,836, filed on Oct. 25, 2019.

(51) Int. Cl.
B01D 46/00 (2022.01)
B01D 46/10 (2006.01)
F24C 15/20 (2006.01)

(52) U.S. Cl.
CPC ..... B01D 46/0005 (2013.01); B01D 46/0093 (2013.01); B01D 46/10 (2013.01);
(Continued)

(58) Field of Classification Search
None
See application file for complete search history.

(56) References Cited

U.S. PATENT DOCUMENTS

| | | | |
|---|---|---|---|
| 875,910 | A | 1/1908 | Helberger |
| 877,876 | A | 1/1908 | Williams |

(Continued)

FOREIGN PATENT DOCUMENTS

| | | |
|---|---|---|
| CA | 181980 | 2/2020 |
| CA | 181981 | 2/2020 |

(Continued)

OTHER PUBLICATIONS

Ash, Handbook of Paint and Coating Raw Materials, vol. 1-2, (2nd Edition), Synapse Information Resources, Inc., 2022 < https://app.knovel.com/hotlink/toc/id:kpHPCRMVE7/handbook-paint-coating/handbook-paint-coating>, 4 pages.

(Continued)

*Primary Examiner* — Jason M Greene (57) ABSTRACT

Filter assemblies are described. In particular, a filter securement assembly for receiving and retaining a filter media in an exhaust hood includes a main panel defining a first end and an opposed second end, a first retainment surface adjacent the first end of the main panel, a first retainment lip adjacent the first retainment surface, a second retainment surface adjacent the second end of the main panel and a (Continued)

second retainment lip adjacent the second retainment surface.

11 Claims, 9 Drawing Sheets

(52) U.S. Cl.
CPC .... *F24C 15/2035* (2013.01); *B01D 2265/027* (2013.01); *B01D 2265/06* (2013.01); *B01D 2279/35* (2013.01)

(56) References Cited

U.S. PATENT DOCUMENTS

| | | | |
|---|---|---|---|
| 896,943 A | 8/1908 | Rutledge | |
| 5,512,074 A | 4/1996 | Hanni et al. | |
| 5,824,126 A * | 10/1998 | Chen | B01D 46/10 55/504 |
| 8,277,530 B2 | 10/2012 | Alexander et al. | |
| 8,999,029 B1 | 4/2015 | Brandt et al. | |
| 9,174,154 B1 | 11/2015 | Tang | |
| 10,300,426 B2 | 5/2019 | Salpietra | |
| 2003/0230062 A1* | 12/2003 | Kubokawa | B01D 46/0005 55/497 |
| 2006/0016339 A1 | 1/2006 | Mirza | |
| 2007/0245703 A1* | 10/2007 | Randinelli | B01D 46/10 55/482 |
| 2008/0110339 A1 | 5/2008 | Kwok et al. | |
| 2010/0071327 A1* | 3/2010 | Alexander | B01D 39/1615 156/60 |
| 2012/0047856 A1 | 3/2012 | Khami et al. | |
| 2014/0366496 A1* | 12/2014 | Salpietra | B01D 46/10 55/501 |
| 2017/0354910 A1 | 12/2017 | Lambertson | |

FOREIGN PATENT DOCUMENTS

| | | |
|---|---|---|
| JP | 08296881 A | 11/1996 |
| JP | 10170046 A | 6/1998 |
| JP | 2012152754 A | 8/2012 |

OTHER PUBLICATIONS

Handbook of Paint and Coating Raw Materials, vol. 1-2, 883-898 (2003).
International Search Report for PCT Application No. PCT/IB2020/059901 mailed on Jan. 27, 2021, 3 pages.
UNILIN Alcohols, Polymers, Baker Hughes, 2011, 2 pages.
UNILIN™ 350 Alcohol, Prospector, Technical Data, TDS-258489, Feb. 7, 2020, 2 pages.

* cited by examiner

FILTER SECUREMENT ASSEMBLY

BACKGROUND

Filters are used for many purposes, such as removing small suspended particulates from air. Filter securement assemblies may releasably retain a filter media in an exhaust hood, among other locations.

SUMMARY

In some aspects, a filter securement assembly for receiving and retaining a filter media in an exhaust hood is disclosed. The filter securement assembly can include a main panel defining a first end and an opposed second end, a first retainment surface can be adjacent the first end of the main panel, a first retainment lip can be adjacent the first retainment surface, a second retainment surface can be adjacent the second end of the main panel and a second retainment lip can be adjacent the second retainment surface.

In some aspects, a filter securement system for receiving and retaining a filter media in an exhaust hood is disclosed. The filter securement system can include a filter securement assembly, including a main panel defining a first end and an opposed second end, a first retainment surface adjacent the first end of the main panel and a second retainment surface adjacent the second end of the main panel. An attachment structure can releasably secure the filter securement assembly to the exhaust hood.

In some aspects, a filter securement system for receiving and retaining a filter media in an exhaust hood is disclosed. The filter securement system can include a filter media defining a first end and an opposed second end and a filter securement assembly. The filter securement assembly can include a first media mount, a first mount attachment structure for securing the first media mount to the exhaust hood, a second media mount, and a second mount attachment structure for securing the second media mount to the exhaust hood. The first media mount can releasably secure the first end of the filter media and the second end can releasably secure the second end of the filter media.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Filter securement assemblies can be used in a wide range of applications. In some embodiments, filter securement assemblies may be designed for general air filtration to filter primarily airborne particulates. For example, filter media within a filter securement assembly may be designed to filter particles smaller than 10 micrometers in diameter, smaller than 5 micrometers in diameter, smaller than 2.5 micrometers in diameter, smaller than 1.0 micrometer in diameter, smaller than 0.5 micrometers in diameter or smaller than 0.3 micrometers in diameter, among others.

Filter securement assemblies can also be used to secure filter media in a specific location, such as an exhaust hood. Such filter securement assemblies may be used for a specialized purpose, such as for grease filtering in a commercial cooking environment. In commercial kitchens, grease capture in exhaust hoods may be important for health, safety and environmental reasons. However, grease buildup in and around an exhaust hood or an exhaust system may pose a fire hazard. To mitigate the hazard, commercial kitchens typically use airflow interrupters or disrupters, such as baffles, made of a non-flammable material, such as a metal or metal alloy, including stainless steel, galvanized steel or aluminum. The baffle can prevent fire from spreading between the cooking surface and the exhaust system. Additionally, aerosolized grease can travel through the complicated path created by the baffles and condense on the surfaces, resulting in grease accumulating further up in the ducts. However, this grease buildup on the baffle requires regular cleaning to maintain the baffle's effectiveness as a fire barrier and a grease collector. Aesthetically, visible grease on a commercial hood baffle can also be undesirable. Removing, cleaning, and reinstalling the baffles can be time consuming, labor-intensive, expensive and dangerous. Thus, versus conventional baffles, the present disclosure can provide a grease-trapping solution that reduces or prevents the buildup of grease on exhaust system components, is light and easy to install in an exhaust hood and can facilitate the easy replacement of filter media within an exhaust hood in a location traditionally occupied by baffles. Other benefits and uses are also foreseen.

The present disclosure provides a filter securement assembly for receiving and retaining a filter media in an exhaust hood for the filtration of grease droplets. Such a filter securement assembly can be designed to replace traditional baffles in an exhaust hood, thereby requiring minimal or no modifications to existing exhaust systems. Further, the filter media received and secured by the filter securement assembly can prevent flames from passing through the filter securement assembly and prevent the buildup of grease on portions of the exhaust system downstream of the filter media. For clarity, moving from the cooking equipment through the exhaust system and past the blower can be defined as moving downstream, while moving in the opposite direction can be defined as moving upstream.

Figure 1:
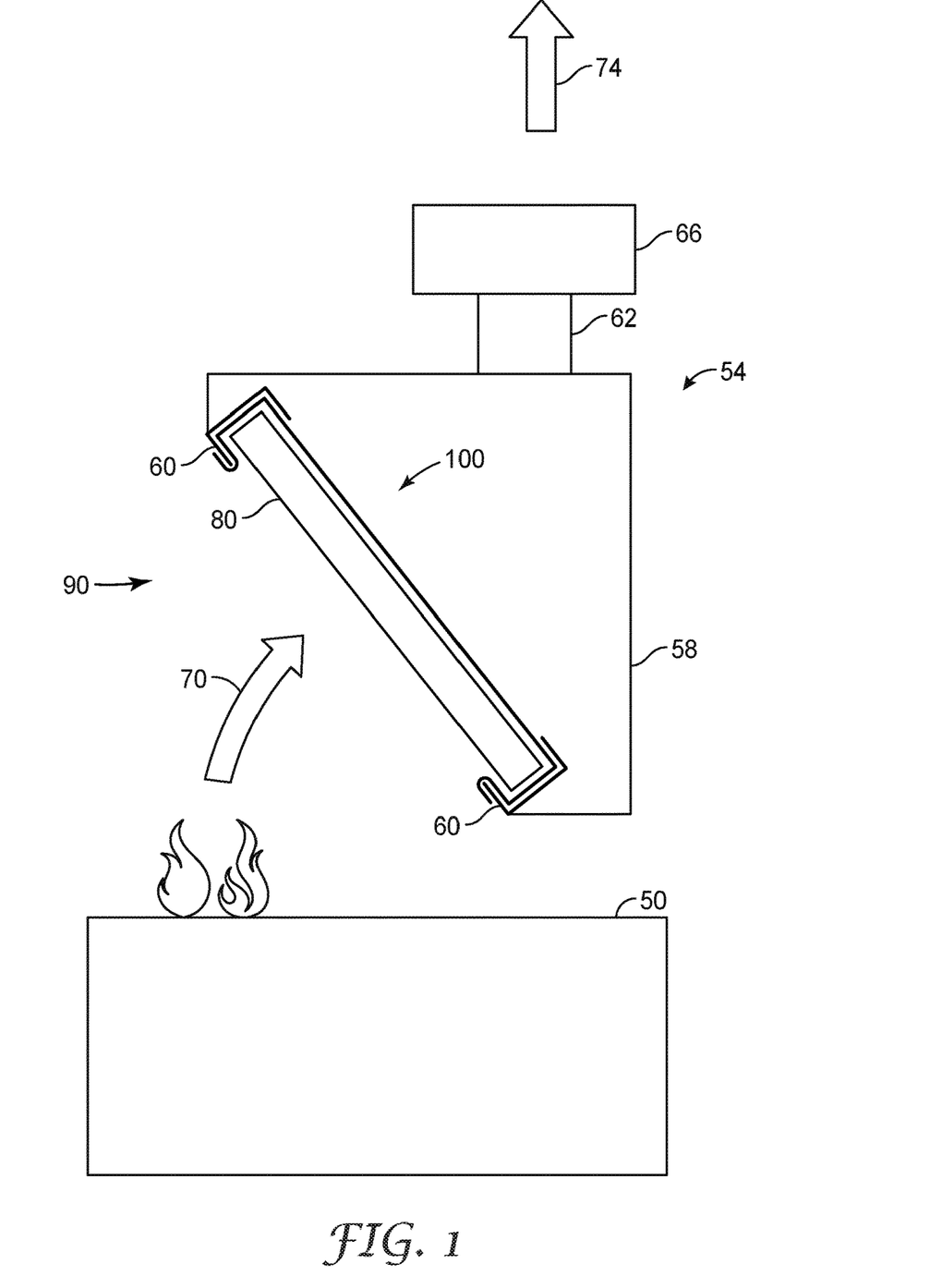
FIG. 1 is schematic system view of a filter securement system including cooking equipment and an exhaust system, according to exemplary embodiments of the present disclosure.

FIG. 1 is a schematic sectional view of a filter securement system 90 including cooking equipment 50 and an exhaust system 54. The cooking equipment 50 can be an oven, stove, grill, fryer, broiler or any other commonly used cooking apparatus known to those skilled in the art. The exhaust system 54 can include an exhaust hood 58 defining an exhaust hood flange 60. The exhaust hood 58 can be positioned to capture all or a portion of grease and other particulates generated by the use of the cooking equipment 50. A blower 66 can, via a duct 62, create a reduced-pressure area proximate the cooking equipment 50 (relative to ambient pressure) that can encourage grease and other particulates generated by use of the cooking equipment 50 to enter the exhaust system 54 via the exhaust hood 58. In such a system, as illustrated in FIG. 1, air, gasses, grease and/or particulates can travel into the exhaust system 54 via the exhaust hood 58 (and filter securement assembly 100 and filter media 80, as will be described below), as represented by arrow 70. The filtered air, gasses and any remaining grease and/or particulates can then pass through the duct 62 and blower 66 before exiting the exhaust system 54, as represented by arrow 74. It is to be understood that filter securement assemblies 100 and filter media 80 releasably mounted on, proximate, adjacent and/or in contact with the exhaust hood flange 60 or exhaust hood 58 are within the scope of this disclosure.

Figure 2:
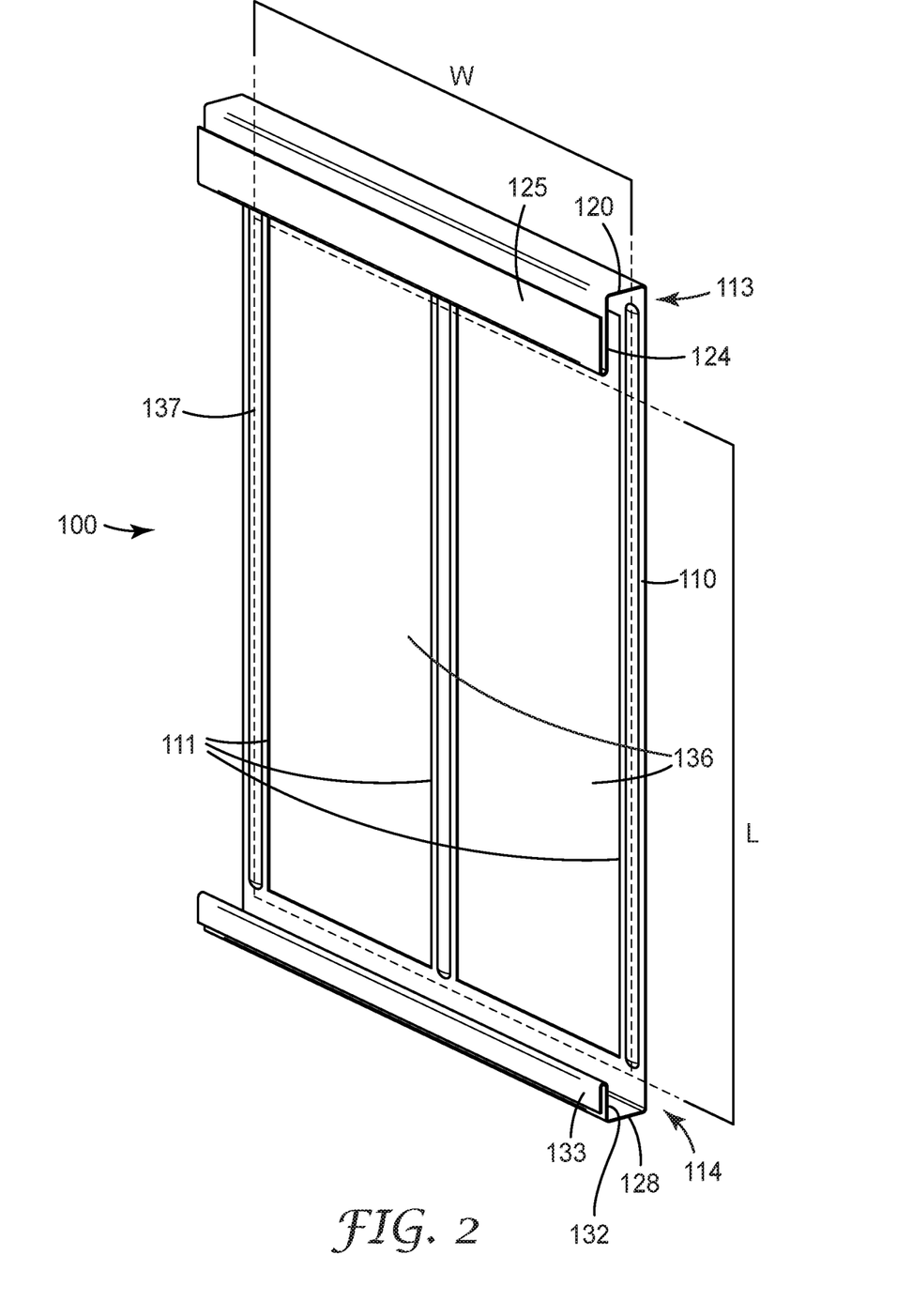
FIG. 2 is an upper perspective view of a filter securement assembly according to exemplary embodiments of the present disclosure.
Figure 3:
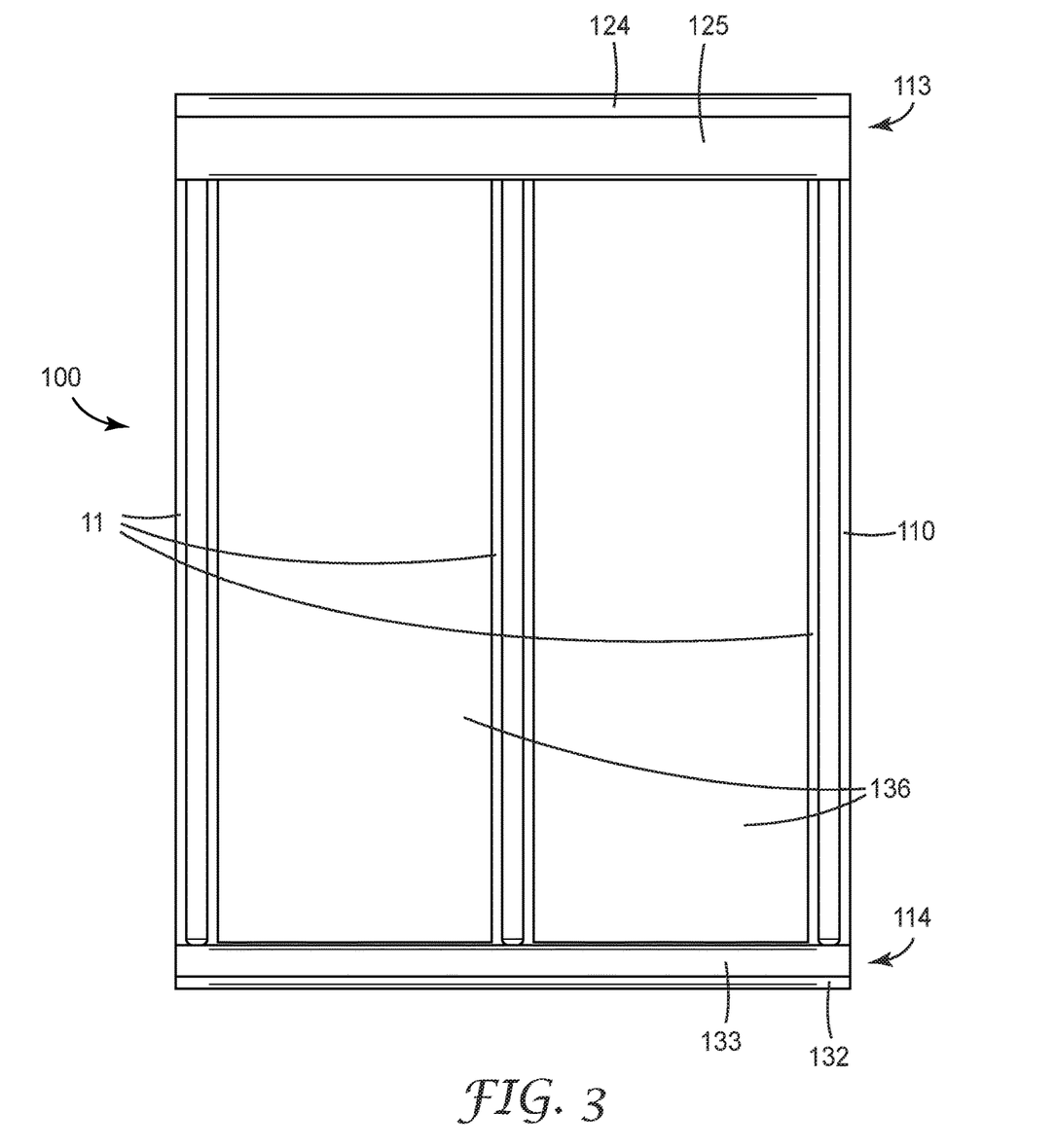
FIG. 3 is a front elevation view of a filter securement assembly according to exemplary embodiments of the present disclosure.
Figure 4:
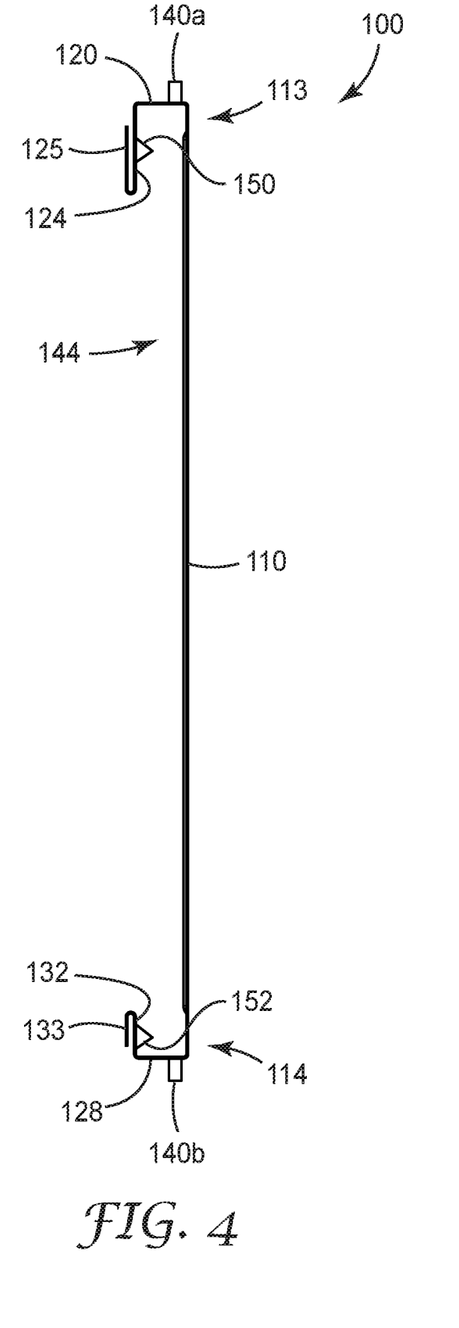
FIG. 4 is a side elevation view of a filter securement assembly according to exemplary embodiments of the present disclosure.

FIGS. 2-4 illustrate an exemplary filter securement assembly 100. The filter securement assembly 100 can include a main panel 110 defining a first end 113 and an opposed second end 114. The main panel 110 can include one or more main supports 111 and the main supports 111 can extend substantially from the first end 113 to the second end 114. The filter securement assembly 100 can include a first retainment surface 120 on, adjacent, in contact with and/or proximate the first end 113. In various embodiments, the first retainment surface 120 can be disposed at an acute, obtuse or right angle to the main panel 110. The filter securement assembly 100 can also include a first retainment lip 124 on, adjacent, in contact with and/or proximate the first retainment surface 120. The first retainment lip 124 and the main panel 110 can be disposed at substantially opposed sides of the first retainment surface 120. In various embodiments, the first retainment lip 124 can be disposed at an acute, obtuse or right angle to the first retainment surface 120. Additionally, the filter securement assembly 100 can include a first mounting surface 125. In various embodiments, the first mounting surface 125 can be disposed at an acute, obtuse or right angle to the first retainment lip 124. The first mounting surface 125 and the first retainment surface 120 can be disposed at substantially opposed sides of the first retainment lip 124.

The filter securement assembly 100 can include a second retainment surface 128 on, adjacent, in contact with and/or proximate the second end 114. In various embodiments, the second retainment surface 128 can be disposed at an acute, obtuse or right angle to the main panel 110. The filter securement assembly 100 can also include a second retainment lip 132 on, adjacent, in contact with and/or proximate the second retainment surface 128. The second retainment lip 132 and the main panel 110 can be disposed at substantially opposed sides of the second retainment surface 128. In various embodiments, the second retainment lip 132 can be disposed at an acute, obtuse or right angle to the second retainment surface 128. Additionally, the filter securement assembly 100 can include a second mounting surface 133. In various embodiments, the second mounting surface 133 can be disposed at an acute, obtuse or right angle to the second retainment lip 132. The second mounting surface 133 and the second retainment surface 128 can be disposed at substantially opposed sides of the second retainment lip 132.

In some embodiments, the first retainment surface 120 is parallel to the second retainment surface 128. In some embodiments, the first retainment lip 124 is parallel with and/or coplanar with the second retainment lip 132. In some embodiments, the first mounting surface 125 is parallel with and/or coplanar with the second mounting surface 133.

The main panel 110 and/or the main supports 111 can define one or more apertures 136 passing through the main panel 110. In some embodiments, the main panel 110 can be substantially rectangular or substantially square. The main panel 110 can define a length L and a width W, a product thereof resulting in a main panel surface area 137. In some embodiments, the apertures 136 can define a portion of the main panel surface area 137. In various embodiments, the apertures 136 define, or form, 10%, 15%, 20%, 25%, 30%, 35%, 40%, 45%, 50%, 55%, 60%, 65%, 70%, 75%, 80%, 85%, 90% or 95% of the main panel surface area 137. In various embodiments, the apertures 136 define, or form, at least 10%, 15%, 20%, 25%, 30%, 35%, 40%, 45%, 50%, 55%, 60%, 65%, 70%, 75%, 80%, 85%, 90% or 95% of the main panel surface area 137. The apertures 136 can have any shape. In non-limiting embodiments, at least some of the apertures 136 can be substantially circular, ovular, triangular, rectangular, pentagonal, hexagonal, heptagonal, octagonal, organic, geometric, semi-circular, crescent-like, parallelogrammatic, quadrilateral, rhomboid and/or stadium-like. Further, in some embodiments the apertures 136 define substantially the same shape while in other embodiments the apertures 136 define two or more different shapes.

The filter securement assembly 100 can include one or more attachment structures 140*a*, 140*b*. The attachment structures 140*a*, 140*b* can permanently or releasably fix or join the filter securement assembly 100 to a portion of the exhaust system 54. In some embodiments, the attachment structures 140*a*, a 40*b* can permanently or releasably fix or join the filter securement assembly 100 to the exhaust hood 58. The attachment structures 140*a*, 140*b* can permanently or releasably fix or join the filter securement assembly 100 to a portion of the exhaust system 54 or the exhaust hood 58 via hooks, clasps, clamps, magnets, adhesives, protrusions, recesses, mechanical fasteners, hook-and-loop panels or any other releasable securement technology known to those skilled in the art.

Figure 9:
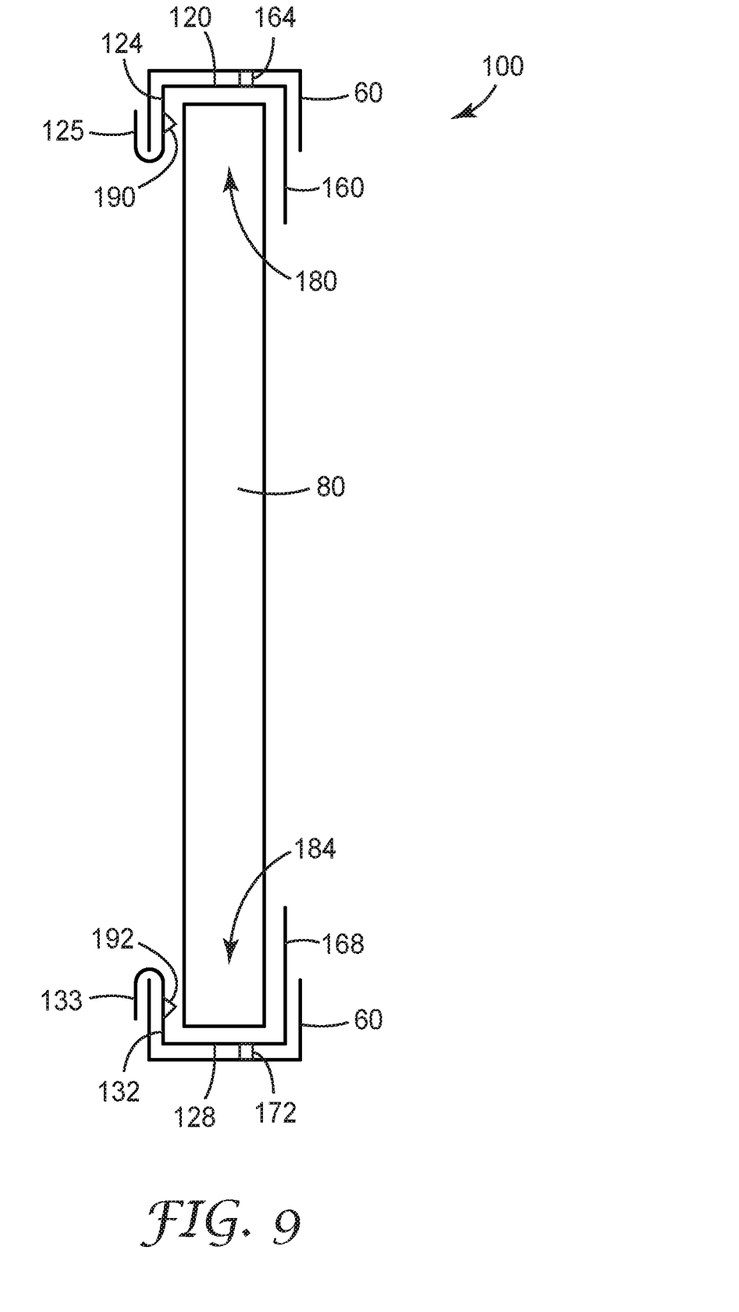
FIG. 9 is a side elevation view of another embodiment of a filter securement assembly according to exemplary embodiments of the present disclosure.

As can be seen in FIGS. 1 and 9, the filter securement assembly 100, or portions thereof, can be disposed within and/or engage the exhaust hood flange 60 to secure the filter securement assembly 100 to the exhaust hood 58. In some embodiments, portions of the filter securement assembly 100 can define an interference, snug, exact or tight fit within the exhaust hood flange 60. In some embodiments, the engagement of portions of the filter securement assembly 100 with the exhaust hood flange 60 in combination with the engagement of the attachment structures 140*a*, 140*b* secures the filter securement assembly 100 within the exhaust hood 58. In some embodiments, a portion of the exhaust hood flange 60 can be disposed between the first mounting surface 125 and the first retainment lip 124 to secure the filter securement assembly 100 to the exhaust hood flange 60. In some embodiments, a portion of the exhaust hood flange 60 can be disposed between the second mounting surface 133 and the second retainment lip 132 to secure the filter securement assembly 100 to the exhaust hood flange 60.

Figure 5:
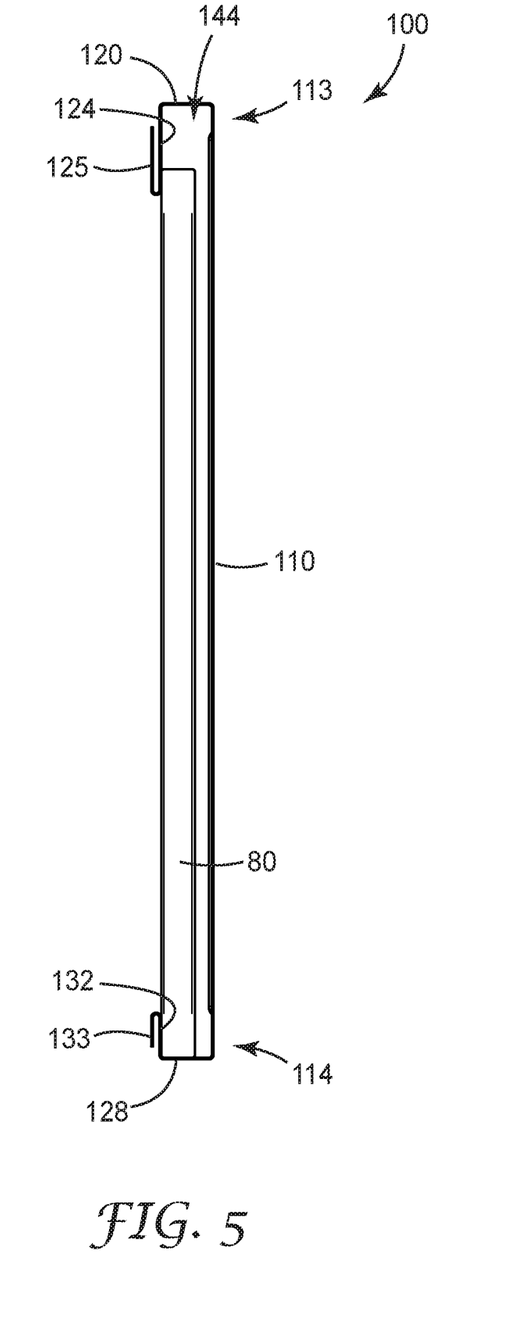
FIG. 5 is a side elevation view of a filter securement assembly, further showing a filter media, according to exemplary embodiments of the present disclosure.
Figure 6:
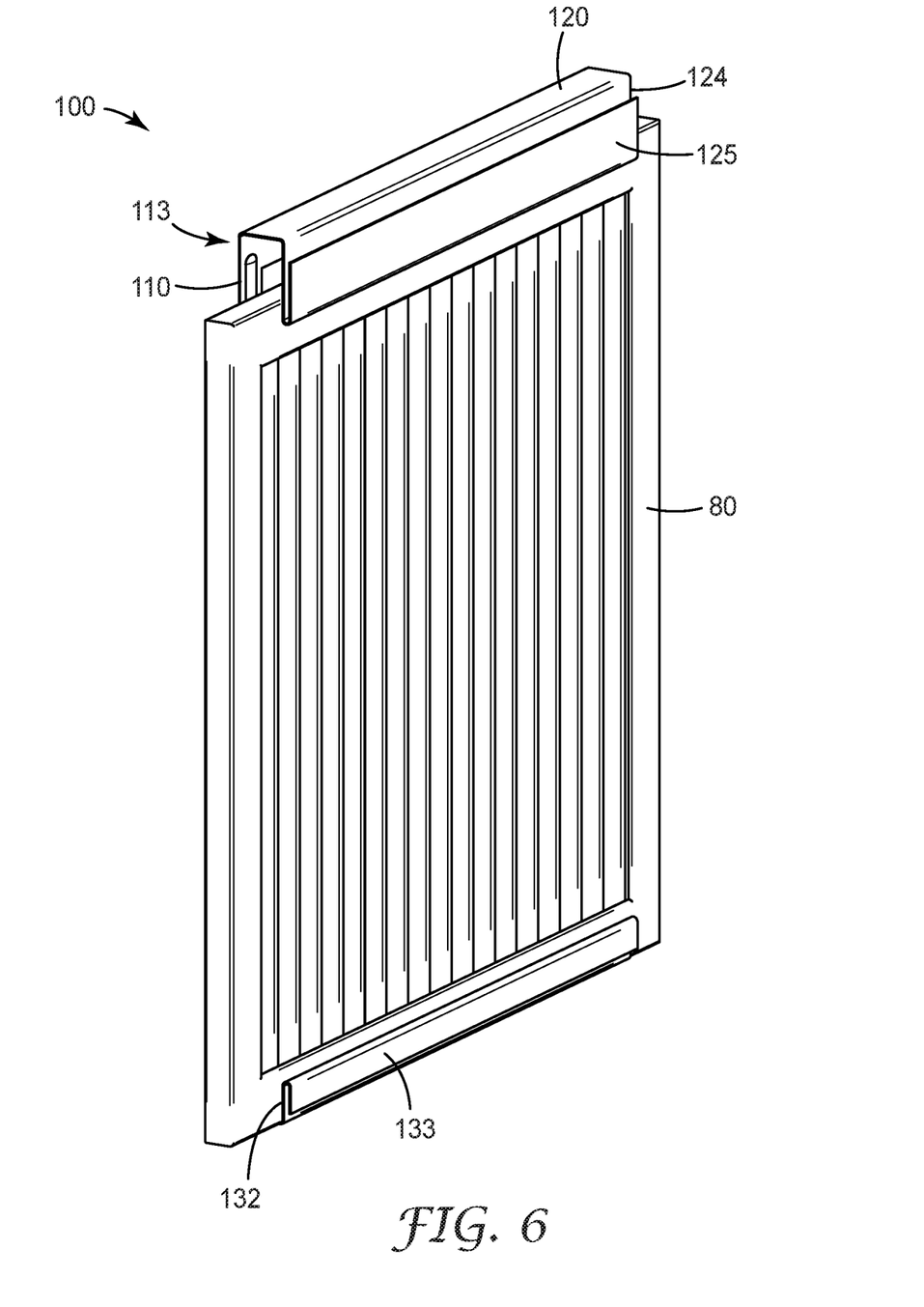
FIG. 6 is an upper perspective view of a filter securement assembly, further showing a filter media, according to exemplary embodiments of the present disclosure.
Figure 7:
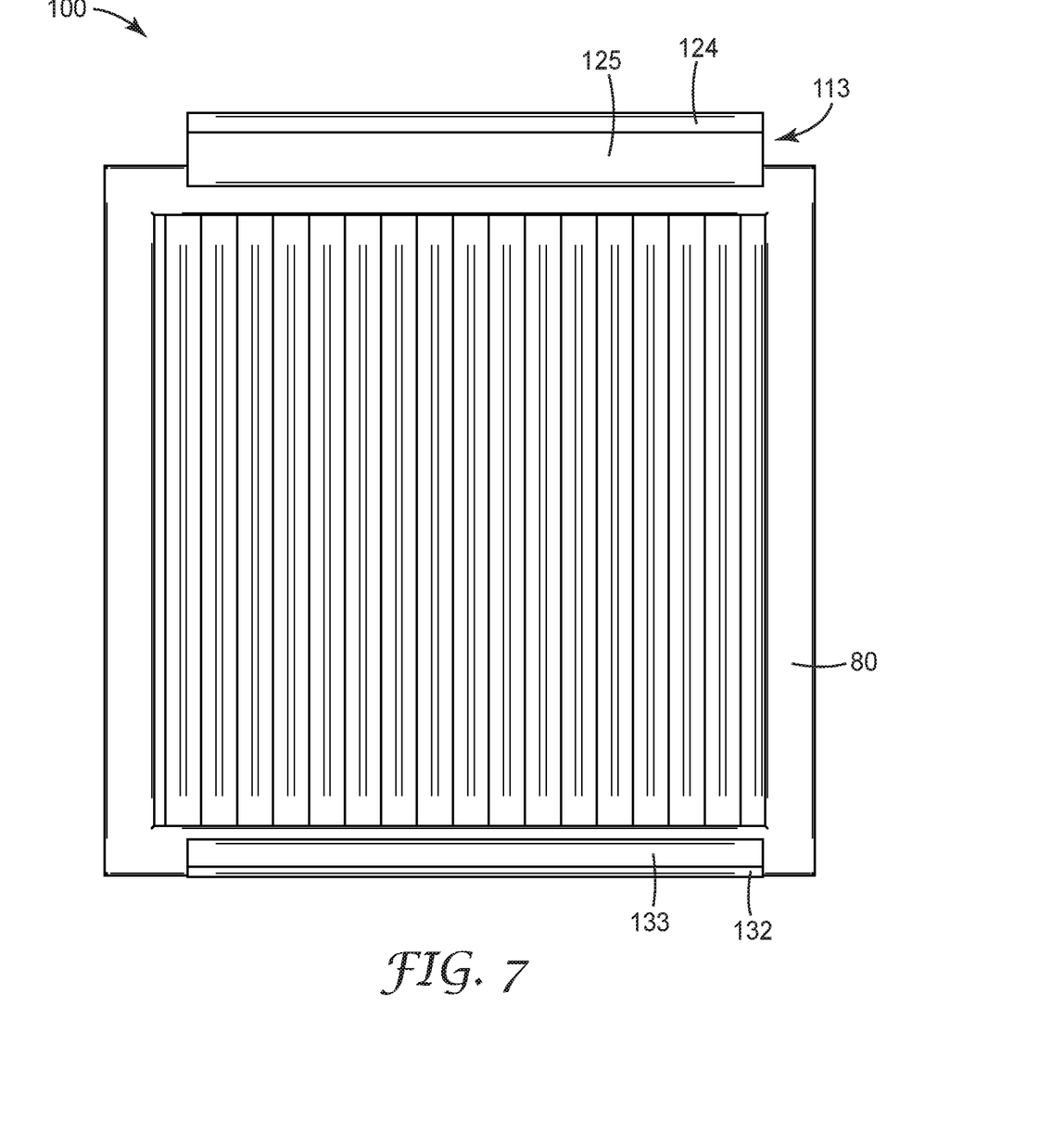
FIG. 7 is a front elevation view of a filter securement assembly, further showing a filter media, according to exemplary embodiments of the present disclosure.

The filter securement assembly 100, or elements thereof, can define a cavity 144. The cavity 144 can be a partially enclosed area bounded on various sides by one or more of the main panel 110, main support 111, first end 113, second end 114, first retainment surface 120, first retainment lip 124, second retainment surface 128 and/or second retainment lip 132. The filter media 80 can be wholly or partially disposed within the cavity 144 when the filter securement assembly 100 secures the filter media 80 (via the attachment structures 140*a*, 140*b*) as a part of the filter securement system 90.

In some embodiments, a first coupling 150 and/or a second coupling 152 can secure the filter media 80 within the cavity 144 and can secure the filter media 80 proximate, adjacent and/or to a portion of the filter securement assembly 100, such as the main panel 110, main support 111, first end 113, second end 114, first retainment surface 120, first retainment lip 124, second retainment surface 128 and/or second retainment lip 132. The first and/or second couplings 150, 152 can include piercing elements, hooks, clasps, clamps, magnets, adhesives, protrusions, recesses, mechanical fasteners, hook-and-loop panels or any other releasable securement technology known to those skilled in the art. Further, the first and/or second couplings 150, 152 can form an interference fit with the filter media 80 when the filter media 80 is disposed in the cavity 144. Further, one or more of the first retainment surface 120, first retainment lip 124, second retainment surface 128 and/or second retainment lip 132 can include a curved portion and/or a faceted portion. Additionally, in various embodiments, one or more of the first retainment surface 120, first retainment lip 124, second retainment surface 128 and/or second retainment lip 132 can be at least 0.5 cm, 1.0 cm, 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, 11.0 cm, 11.5 cm, 12.0 cm, 12.5 cm, 13.0 cm, 13.5 cm, 14.0 cm, 14.5 cm or 15.0 cm. Additionally, in various embodiments, one or more of the first retainment surface 120, first retainment lip 124, second retainment surface 128 and/or second retainment lip 132 can be about 0.5 cm, 1.0 cm, 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, 11.0 cm, 11.5 cm, 12.0 cm, 12.5 cm, 13.0 cm, 13.5 cm, 14.0 cm, 14.5 cm or 15.0 cm. Additionally, in various embodiments, one or more of the first retainment surface 120, first retainment lip 124, second retainment surface 128 and/or second retainment lip 132 can be at most 0.5 cm, 1.0 cm, 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, 11.0 cm, 11.5 cm, 12.0 cm, 12.5 cm, 13.0 cm, 13.5 cm, 14.0 cm, 14.5 cm or 15.0 cm.

In operation, a user, tool and/or machine can dispose the filter securement assembly 100 in the exhaust hood 58. In some embodiments, the attachment structures 140*a*, 140*b* can permanently or releasably fix the filter securement assembly 100 to the exhaust hood 58. In some embodiments, a fit between portions of the filter securement assembly 100 and the exhaust hood flange 60 and/or a fit between the exhaust hood flange 60 and the first and second mounting surfaces 125, 133, can permanently or releasably fix the filter securement assembly 100 to the exhaust hood 58. The user, tool and/or machine can then place the filter media 80 at least partially within the cavity 144. Through operations of the filter securement system 90 (including the exhaust system 54, cooking equipment 50 and blower 66), the filter media 80 disposed in the exhaust hood 58 can filter various particles, grease and/or gasses from the airflow into and through the exhaust hood 58. Upon filter media 80 saturation, a given time interval or another criteria, the user, tool and/or machine can remove the filter media 80 from the cavity 144.

Figure 8:
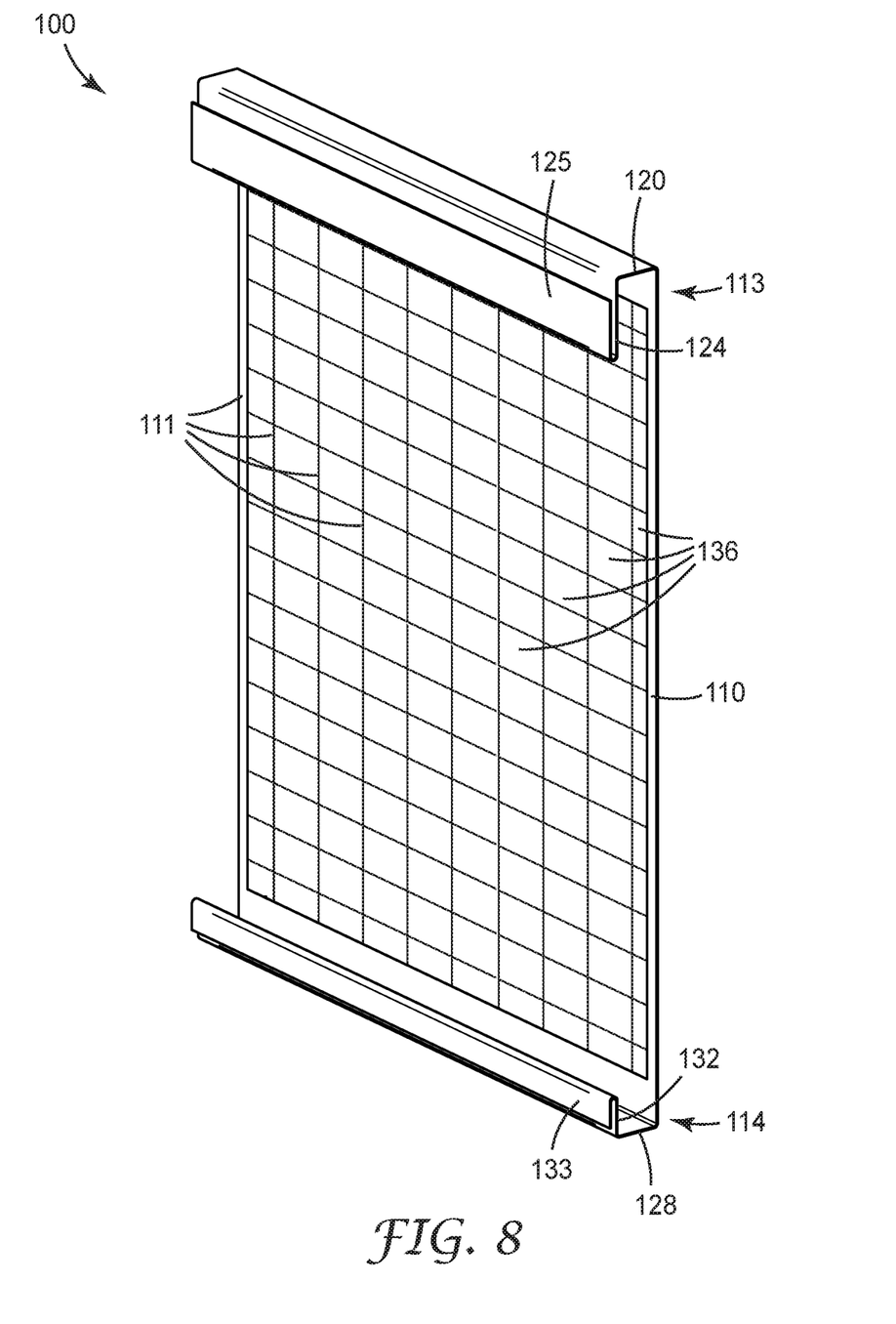
FIG. 8 is an upper perspective view of another embodiment of a filter securement assembly, according to exemplary embodiments of the present disclosure.

In some embodiments, as exemplarily illustrated by FIG. 8, the main panel 110 can include a substantially mesh surface, or a grid, formed by the main supports 111. The main panel supports 111 can define apertures 136, as described above.

In some embodiments, as exemplarily illustrated by FIG. 9, the filter securement assembly 100 can include a first media mount 160 and a second media mount 168. The first media mount 160 and second media mount 168 can be discrete elements, can be disposed apart from one another and/or can be located a non-zero distance from one another. Similar to descriptions above, the first media mount 160 can include the first retainment surface 120, the first retainment lip 124 and the first mounting surface 125. A first mount attachment structure 164 can permanently or releasably fix or join the first media mount 160 to a portion of the exhaust system 54. In some embodiments, the first mount attachment structure 164 can permanently or releasably fix or join the first media mount 160 to the exhaust hood 58.

The second media mount 168 can include the second retainment surface 128, the second retainment lip 132 and second mounting surface 133. A second mount attachment structure 172 can permanently or releasably fix or join the second media mount 168 to a portion of the exhaust system 54. In some embodiments, the second mount attachment structure 172 can permanently or releasably fix or join the second media mount 168 to the exhaust hood 58. The first mount attachment structure 164 and the second mount attachment structure 172 can, releasably or permanently fix or join the first media mount 160 and second media mount 168, respectively, to one or more of the exhaust hood 58 and exhaust system 54 in the same or similar manner as the attachment structures 140*a*, 140*b* join other embodiments of the filter securement assembly 100 to the exhaust hood 58 and/or exhaust system 54.

In some embodiments, as also seen in FIG. 9, the filter media 80 can define a filter media first end 180 and an opposed filter media second end 184. A first mount coupling 190 can be disposed on a portion of the first media mount 160 and can secure the filter media 80, and particularly the filter media first end 180, proximate, adjacent and/or to a portion of the first media mount 160, such as the first retainment surface 120 and/or the first retainment lip 124. Similarly, a second mount coupling 192 can be disposed on a portion of the second media mount 168 and can secure the filter media 80, and particularly the filter media second end 184 proximate, adjacent and/or to a portion of the second media mount 168, such as the second retainment surface 128 and/or second retainment lip 132. The first mount coupling 190 and/or the second mount coupling 192, can include piercing elements, hooks, clasps, clamps, magnets, adhesives, protrusions, recesses, mechanical fasteners, hook-and-loop panels or any other releasable securement technology known to those skilled in the art. The first and second media mounts 160, 168, along with the first and second mount couplings 190, 192, can secure the filter media 80 within the exhaust hood 58, such the filter media 80 can filter various particles, grease and/or gasses from the airflow into and through the exhaust hood 58. Further, the first and second mount couplings 190, 192 can form an interference fit with the filter media 80 when the filter media 80 is disposed in first media mount 160 and/or the second media mount 168.

Figure 10:
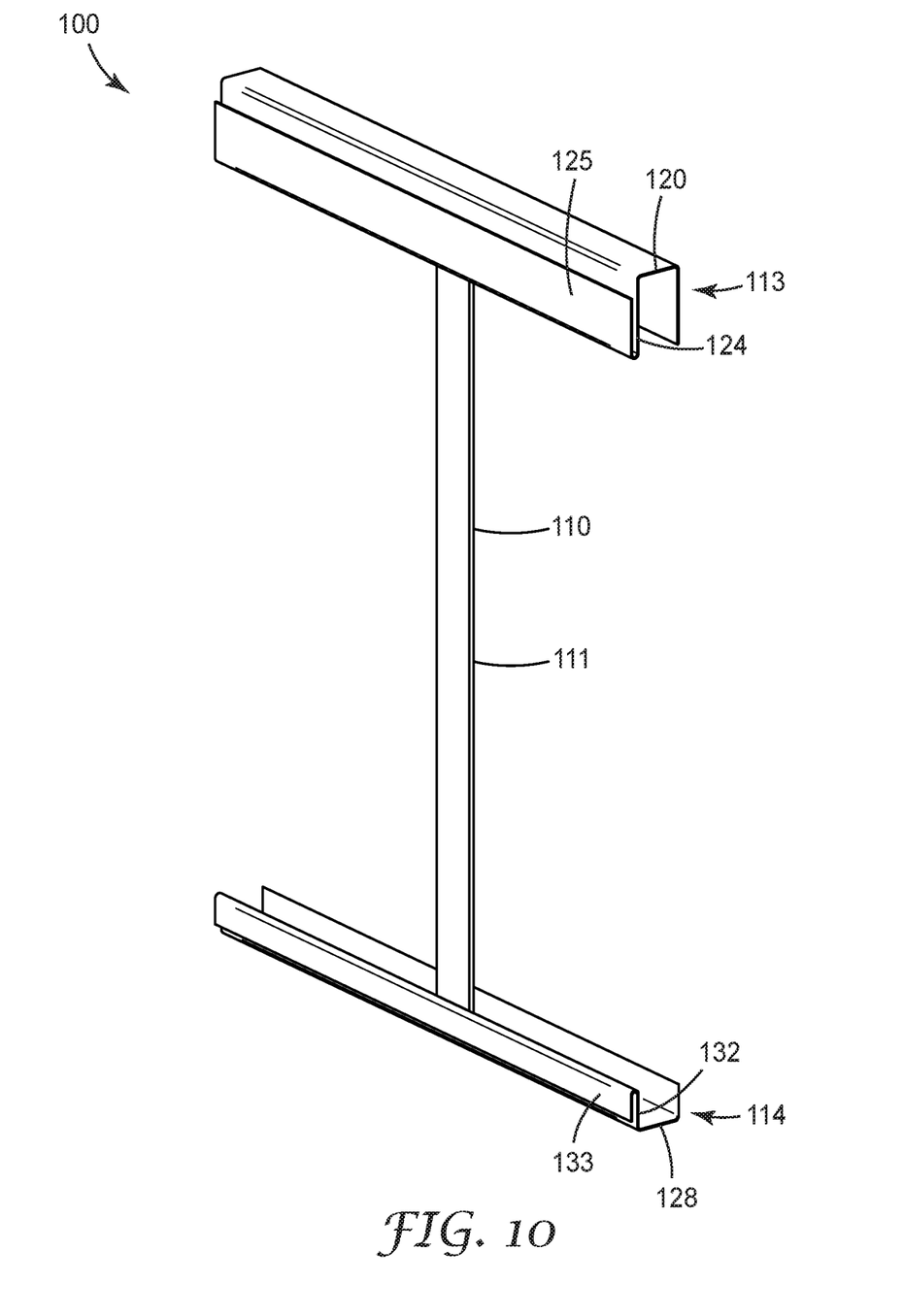
FIG. 10 is an upper perspective view of another embodiment of a filter securement assembly, according to exemplary embodiments of the present disclosure.

In some embodiments, as exemplarily illustrated by FIG. 10, the main panel 110 can include a single main support 111. The main panel support 111 can be located laterally centrally in the filter securement assembly 100. Such an embodiment can further reduce system weight and aid in user manipulability.

The filter media 80, as can be seen in FIGS. 1, 5-7 and 9, can include any one or more materials or mechanical filter arrangements known to those skilled in the art. In particular, the filter media 80 can include any one or more of a Flame-Resistant (FR) media web, a woven material, a non-woven material, oxidized polyacrylonitrile (OPAN), FR rayon, modacrylic, basalt, fiberglass, wool and ceramic. In some embodiments, the filter media 80 includes a conventional filter media material (such as polyolefin) that has been treated or coated to be flame-resistant. In some embodiments, the filter media 80 includes a conventional filter media material and a metal mesh and/or a flame-resistant barrier. In various embodiments, the filter media 80 can be pleated, non-pleated and/or multilayered, based upon application.

The filter securement assembly 100, and each element thereof, can include one or more of a metal (such as aluminum), metal alloy (such as stainless steel), fiberglass, ceramic, composite material, carbon composite material, stone, plastic, wood-based product, a Flame-Resistant (FR) material, a material treated and/or coated with an FR material or any other suitable material known to those skilled in the art.

Certain embodiments of main panel 110, apertures 136 and/or main support 111, are disclosed in U.S. Design application. Ser. No. 29/629,926, filed 18 Dec. 2017, U.S. Design Appl. Ser. No. 29/630,262, filed 20 Dec. 2017, U.S. Design application. Ser. No. 29/630,249, filed 20 Dec. 2017, U.S. Design application. Ser. No. 29/662,774, filed on 7 Sep. 2018, issued on 18 Feb. 2020 as Pat. No. D875,910, and U.S. Design application. Ser. No. 29/662,776, filed 7 Sep. 2018, issued on 10 Mar. 2020 as Pat. No. D877,876.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure. The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control.

What is claimed is:

1. A filter securement assembly for receiving and retaining a filter media in an exhaust hood, comprising:
   a main panel defining a first end and an opposed second end;
   a first retainment surface adjacent the first end of the main panel;
   a first retainment lip adjacent the first retainment surface;
   a first mounting surface disposed at an acute angle to the first retainment lip;
   a second retainment surface adjacent the second end of the main panel;
   a second retainment lip adjacent the second retainment surface; and
   a second mounting surface disposed at an acute angle to the second retainment lip.

2. The filter securement assembly of claim 1, wherein the first retainment surface is substantially perpendicular to the main panel.

3. The filter securement assembly of claim 1, wherein the second retainment surface is substantially perpendicular to the main panel.

4. The filter securement assembly of claim 1, where one or more of the main panel, first retainment surface and second retainment surface include a flame-retardant paperboard.

5. The filter securement assembly of claim 1, where one or more of the main panel, first retainment surface and second retainment surface include stainless steel.

6. The filter securement assembly of claim 1, where one or more of the main panel, first retainment surface and second retainment surface include aluminum.

7. The filter securement assembly of claim 1, wherein the main panel defines one or more apertures, the apertures forming at least 60% of a main panel surface area.

8. The filter securement assembly of claim 1, wherein the first retainment lip is substantially perpendicular to the first retainment surface.

9. The filter securement assembly of claim 1, wherein the second retainment lip is substantially perpendicular to the second retainment surface.

10. The filter securement assembly of claim 1, further including an attachment structure for releasably securing the filter securement assembly to the exhaust hood.

11. The filter securement assembly of claim 10, wherein the attachment structure includes one or more magnets for joining the exhaust hood with the filter securement assembly.

* * * * *